Patented Feb. 11, 1947

2,415,657

UNITED STATES PATENT OFFICE 2,415,657

STABLE HYPOCHLORITE COMPOSITION

Walter S. Riggs, Haddon Heights, and Norman D. Peschko, Haddonfield, N. J., assignors to The Pennsylvania Salt Manufacturing Company, Philadelphia, Pa., a corporation of Pennsylvania No Drawing. Application November 4, 1942, Serial No. 464,542

7 Claims. (Cl. 252—99)

Chemical composition

This invention relates to stable concentrated hypochlorite compositions and more particularly to concentrated hypochlorite compositions containing a surface active or wetting agent.

Wetting agents, which are of organic nature, have been admixed with hypochlorites in compositions where the concentration of the hypochlorite has been low, a limitation imposed by the recognized tendency of organic materials to decompose in the presence of oxidizing agents.

An object of this invention is to provide, contrary to prior art practice, a mixture containing a high concentration of hypochlorite and a wetting agent which is safe and stable within practical limits (for storage and shipping purposes) of the concentrated hypochlorite alone.

Another object of this invention is to provide a high available chlorine content hypochlorite composition having improved wetting properties when dissolved or diluted to use concentrations.

A further object of the invention is to provide a hypochlorite composition containing a wetting agent and having good calcium sequestering or dispersing power.

To prepare a high available chlorine content hypochlorite-wetting agent composition, the wetting agent must:

(1) Be resistant to oxidation (stable in concentrated hypochlorite);
(2) Be inert to hypochlorites (not promote hypochlorite decomposition); and
(3) Have good wetting properties in hypochlorite solutions.

Many of the wetting agents recommended for improving the wetting properties of low available chlorine hypochlorite mixtures such as salts and esters of dicarboxylic acids, for example, the diamyl and dioctyl esters of sodium sulfo succinate; alkyl sulfates, for example the sodium sulfate of technical lauryl alcohol and sodium stearyl sulfate, were tested and, as expected, for the most part these gave unstable, inflammable and even explosive mixtures depending upon the concentration of the hypochlorite and whether it was dry or in solution. Some of the agents tested did, however, yield satisfactory results and according to the invention have been found to belong to the class of alkaryl sulfonates in which there is no substituent other than the sulfonate group. For example, it has been found that solid dry mixtures of calcium hypochlorite containing as high as 70% available chlorine and as much as 10% of these wetting agents are stable within 10% to 15% of the hypochlorite alone for periods of from 2000 to 5000 hours at a temperature of 100° F. Also, solutions of sodium hypochlorite having 15% available chlorine and sufficient wetting agent to reduce the surface tension of the solution, upon dilution to use concentrations, by 30 dynes/cm., were found stable to within 5% of the hypochlorite alone.

For example, agents which have been used to accomplish the invention are alkylated benzene sodium sulfonates, alkylated naphthalene sodium sulfonates and the sodium sulfonate of the product of chlorinated kerosene condensed with benzene.

With these agents, hypochlorite compositions of high stability can be prepared. These are capable even after 5000 hours storage at 100° F. of producing solutions of good sudsing power and are excellent bleaching, germicidal, disinfectant and deodorizing agents.

Examples of such compositions are given in the following table:

| Hypochlorite | Per cent available chlorine in hypochlorite | Trade name of agent of class of alkyl-aryl and/or aryl-alkyl sulfonates | Per cent agent in mixture |
|---|---|---|---|
| Calcium hypochlorite | 70-72 | Santomerse #1 | 3.0-10 |
| Do | 70-72 | Santomerse #2 | 1.5-10 |
| Do | 70-72 | Santomerse #3 | 0.5-10 |
| Do | 70-72 | Santomerse D | 3.0-10 |
| Do | 70-72 | Nacconol NR | 4.5-10 |
| Do | 50 | Santomerse #2 | 10 |
| Do | 50 | Nacconol NR | 10 |
| Sodium hypochlorite | 15 | Santomerse #1 | 1.5 |
| Do | 15 | Santomerse #2 | 0.7 |
| Do | 15 | Santomerse #3 | 0.6 |
| Do | 15 | Santomerse D | 3.0 |
| Do | 15 | Nacconol NR | 1.0 |
| Do | 15 | Alkanol SA | 7.0 |
| Calcium hypochlorite | 60 | $Na_4P_2O_{11}$ | 2.0 |
|  |  | Santomerse #2 | 10 |
| Do | 46 | $Na_4P_2O_{11}$ | 2.0 |
|  |  | Nacconol NR | 10 |

The chemical composition of the agents identified by trade names in the table is as follows:

| Trade name | Compound name of wetting agent |
|---|---|
| "Santomerse #1" | Dodecyl benzene sodium sulfonate. |
| "Santomerse #2" | Alkyl aryl [1] sodium sulfonate. |
| "Santomerse #3" | Dodecyl benzene sodium sulfonate. |
| "Santomerse D" | Alkyl aryl [1] sodium sulfonate. |
| "Nacconol NR" | Sodium sulfonate of the condensation product of chlorinated kerosene with benzene. |
| "Alkanol SA" | Alkyl naphthalene sodium sulfonate. |

[1] Exact nature of the aryl group has not been disclosed by the manufacturer but is apparently a benzene residue. Alkyl group is approximately dodecyl to tetradecyl.

In general, the hypochlorite used to prepare the composition of this invention, if an alkaline earth hypochlorite, will test in the range of 50%–75% available chlorine; and, if an alkali metal hypochlorite, it will test in the range of 15%–25% available chlorine.

In order to prepare a composition with good calcium sequestering properties an alkali metal salt of one of the phosphoric acids, such as tetraphosphoric acid, may be incorporated in the hypochlorite wetting agent mixture. Among the phosphates known to have calcium sequestering or dispersing properties and which have been found to yield effective results are sodium tetraphosphate, sodium hexametaphosphate, sodium metaphosphate and tetrasodium pyrophosphate.

The term "calcium hypochlorite composition" employed in the claims is intended to include only calcium hypochlorite itself and mixtures of calcium hypochlorite with diluents that have no substantial effect on hypochlorite stability, e. g., diluents such as the phosphates above referred to, or salts such as those normally present in minor proportion in commercial calcium hypochlorite to bring its available chlorine content down to 50%.

It will be understood that the invention is not limited to any of the above proportions, agents or hypochlorites, the essence of the invention being that, contrary to expectations and prior art practice, high available chlorine content hypochlorites have been mixed with wetting agents (organic materials) and that such mixtures have been found stable in the cases of certain wetting agents.

We claim:

1. A substantially dry solid composition consisting of about 99.5% to 90% by weight of a 50% to 75% available chlorine content calcium hypochlorite and about 0.5% to 10% by weight of an alkyl aryl sulfonate wetting agent, in which alkyl aryl sulfonate the alkyl aryl residue contains no substituent other than the sulfonate group.

2. A composition according to claim 1 wherein the alkyl aryl sulfonate wetting agent is a long chain alkyl benzene sodium sulfonate.

3. A composition according to claim 1 wherein the alkyl aryl sulfonate wetting agent is an alkylated naphthalene sodium sulfonate.

4. A composition according to claim 1 wherein the alkyl aryl sulfonate wetting agent is an alkyl benzene sodium sulfonate in which the alkyl groups are kerosene hydrocarbon radicals.

5. A substantially dry solid composition consisting of about 99.5% to 90% by weight of a mixture of calcium hypochlorite and an alkali metal salt of phosphoric acid having calcium sequestering properties, said mixture having a 50 to 75% available chlorine content, and about 0.5% to 10% by weight of an alkyl aryl sulfonate wetting agent, in which alkyl aryl sulfonate the alkyl aryl residue contains no substituent other than the sulfonate group.

6. A substantially dry solid composition consisting of about 99.5% to 90% by weight of a 50% to 75% available chlorine content calcium hypochlorite composition and about 0.5% to 10% by weight of an alkyl aryl sulfonate wetting agent, in which alkyl aryl sulfonate the alkyl aryl residue contains no substituent other than the sulfonate group.

7. A substantially dry solid composition consisting of about 99.5% to 90% by weight of a calcium hypochlorite containing at least 50% available chlorine and about 0.5% to 10% by weight of an alkyl aryl sulfonate wetting agent in which alkyl aryl sulfonate the alkyl aryl residue contains no substituent other than the sulfonate group.

WALTER S. RIGGS.
NORMAN D. PESCHKO.

REFERENCES CITED

The following references are of record in the file of this patent:

UNITED STATES PATENTS

| Number | Name | Date |
|---|---|---|
| 2,320,280 | Kalusdian | May 25, 1943 |
| 2,319,697 | MacMahon | May 18, 1943 |
| 2,020,385 | Todd | Nov. 12, 1935 |
| 2,196,985 | Flett | Apr. 16, 1940 |
| 2,161,173 | Kyrides | June 6, 1939 |
| 2,283,199 | Flett | May 19, 1942 |

OTHER REFERENCES

Nacconol NR, Booklet pub. by Allied Chem. & Dye Corp., N. Y., 1938, pages 9 and 14. (Copy in Div. 64.)